CATHODE RAY DEFLECTION SYSTEM

Filed Oct. 30, 1953 3 Sheets-Sheet 1

INVENTORS
SIMEON I. TOURSHOU
& BURNARD E. NICHOLSON
BY [signature]
ATTORNEY

INVENTORS
SIMEON I. TOURSHOU
& BURNARD E. NICHOLSON
BY [signature]
ATTORNEY

INVENTORS
SIMEON I. TOURHOU
& BURNARD E. NICHOLSON
BY [signature]
ATTORNEY

United States Patent Office 2,793,322
Patented May 21, 1957

2,793,322

CATHODE RAY DEFLECTION SYSTEM

Simeon I. Tourshou, Philadelphia, Pa., and Burnard E. Nicholson, Haddonfield, N. J., assignors to Radio Corporation of America, a corporation of Delaware Application October 30, 1953, Serial No. 389,234

The terminal fifteen years of the term of the patent to be granted has been disclaimed 9 Claims. (Cl. 315—27)

The present invention relates to deflection circuits for cathode ray tubes and, more particularly, although not necessarily exclusively, to an improved form of amplitude control arrangement whereby the amplitude of the electromagnetic cathode ray beam deflection may be controlled without deleteriously affecting the deflection yoke current waveform producing the deflection.

In one of its more specific forms, the present invention is involved with a novel form of width control for television receivers employing a combination kinescope high voltage and deflection current generator such that a substantial range of amplitude variation is afforded by the width control without greatly affecting the generated high voltage or the linearity of deflection current. As will appear, the invention is especially suited for use in conjunction with television receiver electromagnetic deflection circuits of either the "direct drive" or autotransformer variety. In that branch of the electrical art dealing with the electromagnetic deflection of cathode ray beams, considerable attention has been drawn to the need for providing a simple but effective circuit arrangement for varying the amplitude of the beam deflection without incurring excessive circuit losses and impairing the character of beam deflection through the imposition of distorting effects on the deflection current waveform. In television receiver electromagnetic deflection systems, one of the most widely used width control arrangement has taken the form of a "width control coil" in circuit with the deflection winding. It has, however, been found that the omission of the width control coil commonly employed provides approximately 10 to 15% more available deflection energy.

It is, therefore, a primary object of the present invention to provide improved apparatus for amplitude control of electromagnetic deflection systems.

Another object of the present invention is that of providing amplitude control means as set forth requiring no energy-dissipating inductances or sources of substantial deflection energy loss.

In U. S. Patent No. 2,536,857, granted January 2, 1951, to O. H. Schade, there is described, inter alia, means for controlling deflection amplitude comprising a variable capacitor connected between the plate of the deflection output amplifier and a point of fixed potential. The present applicants have found that, in view of the high voltage pulses developed in the step-up winding of the output transformer, it is necessary to provide special safeguards against arcing where it is desired to provide a variable capacitor in that electrical location.

Thus, it is a further object of this invention to provide means comprising a novel switch having "shorting" and "non-shorting" contact members for adding or removing capacitance in a circuit of the type described.

Another form of width control is that described and claimed in U. S. Patent No. 2,555,832, granted June 5, 1951, to B. E. Denton, wherein there is disclosed a variable resistor in series with the deflection winding of a horizontal deflection circuit, the resistor being connected, at one end, to the "B+" terminal of the circuit and, at its other end, to the winding. As stated therein, the variable resistor changes the "Q" of the deflection winding and affords a mode of effecting the division of current flow between that winding and the damper diode. In accordance with another aspect of the present invention, the novel switch referred to supra includes certain positions which insert different quantities of resistance in series with the "linearity capacitor" described and claimed in the Tourshou Patent 2,555,831, granted June 5, 1951, such as to vary the deflection current by changing the shape of the voltage waveform which is developed across that capacitor. Thus, as distinguished from the Denton circuitry wherein the variable resistor is in a series circuit with the deflection winding, which series circuit is in shunt with the damper tube, the resistance introduced by means of the switch of the present invention is in series with the damper diode so that its function may be said to be directly that of controlling current flow therethrough.

By way of summary, therefore, it will be seen that the present invention contemplates deflection "size" or amplitude control apparatus which includes a novel switch arrangement for selectively varying the plate capacity of the deflection output tube and for introducing a loss factor in the deflection winding current, as will appear more fully hereinafter. In general, the present invention, as applied to a direct-drive type of horizontal deflection circuit, by way of illustration, comprises a switch for selectively producing predetermined amounts of capacitive coupling between the plate of the horizontal output tube and the deflection winding and for selectively (and, if desired, simultaneously) increasing the value of a resistor in series with the conventional "linearity capacitor" of the deflection circuit to decrease the amplitude of deflection. In this manner, the size control of the present invention encompasses an extremely wide range of operation. Moreover, by virtue of the novel switch structure of the invention, arcing during switching action is avoided, thereby enhancing the value of the invention as an adjunct to a home instrument receiver, for example.

Thus, it is another object of the invention to provide means for selectively controlling deflection amplitude in a cathode ray beam deflection system.

Another object hereof is that of providing size control means for cathode ray beam deflection, which means afford a substantially increased control range over that heretofore realized, while not introducing undesirable deflection distortion.

Still another object of the invention is the provision of means as set forth for selectively switching in various degrees of coupling between the output of the deflection power tube and the deflection coils themselves.

A still further object of the invention is to provide means as described for selectively switching in different values of resistance in series with the "linearity capacitor" of a deflection circuit of the type described in U. S. Patent 2,555,831 of the deflection power tube.

Additional objects and advantages of the present invention will become apparent to persons skilled in the art from a study of the following detailed description of the accompanying drawing, in which.

Figure 1:
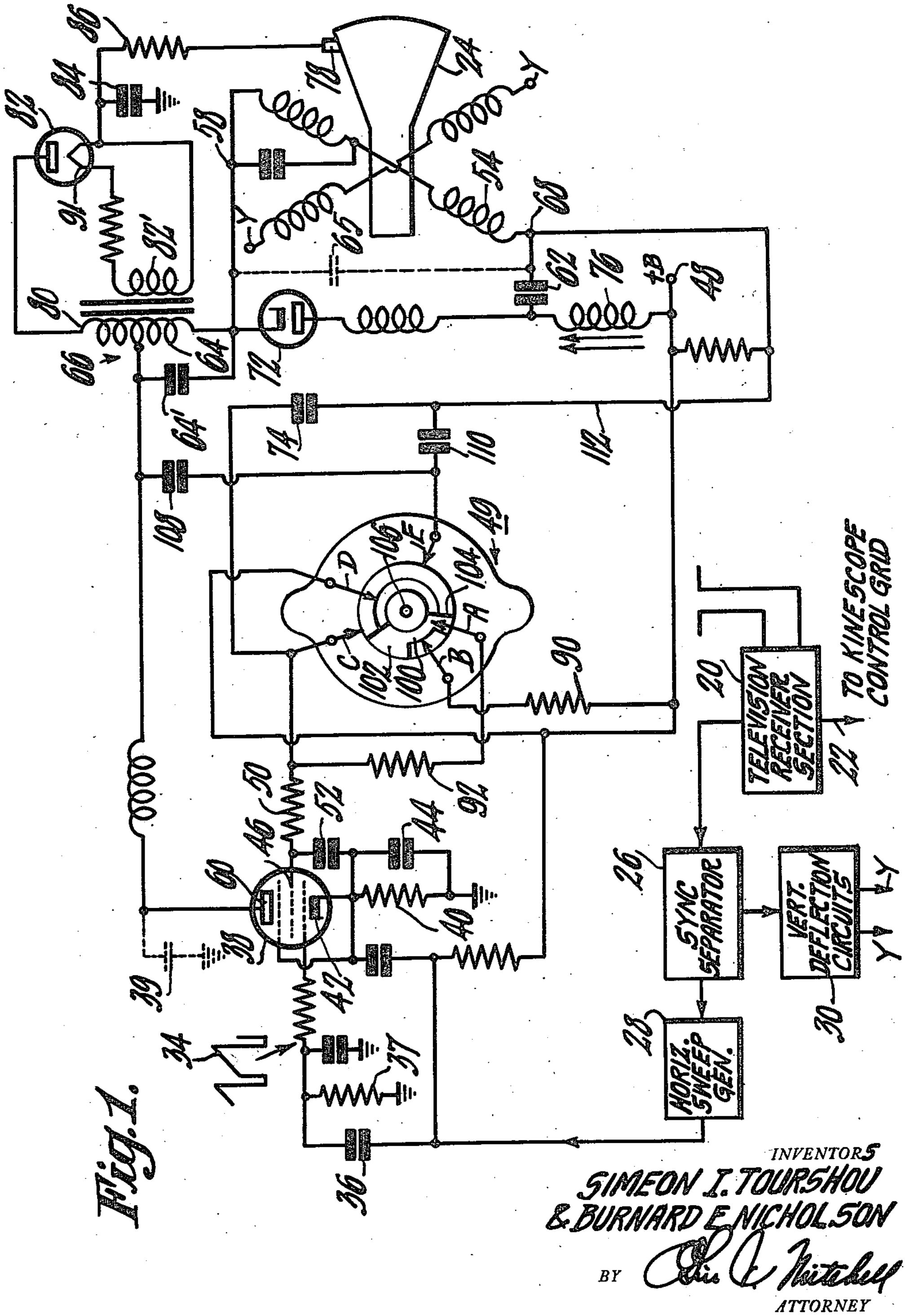
Fig. 1 illustrates, by way of block and schematic diagram, a television receiver embodying the novel width control apparatus of the present invention.

Referring to the drawing and, particularly, to Fig. 1, the block indicated by reference numeral 20 comprises a television receiver including the conventional R. F., converter, I. F. and video detector circuits which derive from a received television signal the video information which is applied via lead 22 to the control grid (not shown) of image reproducing kinescope 24. In accordance with conventional television techniques, the received signal train may further include horizontal and vertical synchronizing information which is removed by sync separator 26 and applied, respectively, to the horizontal deflection signal generator 28 and to the vertical deflection circuits 30. The vertical deflection system may, for example, comprise the usual sawtooth waveform generator which serves to drive a field frequency sawtooth of current through the vertical deflection winding 32, in a well-known manner.

The horizontal deflection generator may take any suitable form for furnishing a sawtooth waveform such as that indicated at 34 to the horizontal deflection output stage. Thus, the output of deflection generator 28 is coupled via capacitor 36 and resistor 37 to the control grid of horizontal output or discharge tube 38. A suitable cathode biasing resistor 40 is connected between the cathode 42 of the discharge tube 38 and ground potential, bypass capacitor 44 being provided to reduce degeneration in the cathode circuit. A screen grid 46 is connected to a source of positive potential 48 indicated as "+B" through a screen dropping resistor 50, connection between the screen grid resistor 50 and the "B" terminal being made through switch 49 in a manner to be described. Since the structure of the switch 49 will be described in detail hereinafter, no further explanation of this connection is deemed necessary at this point. The screen dropping resistor 50 is, in turn, bypassed to the cathode 42 by means of a capacitor 52, as shown in the drawing.

The specific deflection winding arrangement shown in Fig. 1 is not a part of the present invention but is described and claimed in U. S. Patent 2,555,831 to S. I. Tourshou, cited supra. According to that patent, in order to achieve "B-boost" power recovery reaction scanning with the horizontal deflection winding 54, which is positioned for deflection of the beam in the cathode ray tube 24, the upper terminal 58 of winding 54 is connected with the discharge tube plate 60 through the primary 64 of pulse step-up auto transformer 66. The lower terminal 68 of the deflection winding 54 is connected via "B-boost" capacitor 62 and linearity coil 76 to the source of positive potential 48 ("+B") from which is supplied energy to the deflection circuit. A damping diode 72 is provided for damping the deflection winding 54 and is connected in shunt therewith. A "linearity" capacitor 74 is connected from terminal 68 and in series with the resistors 90 and 92 to the "B" terminal 48, this connection being made through switch 49. The function of resistors 90 and 92 in conjunction with linearity capacitor 74 will be explained more fully hereinafter.

The high voltage power supply for the accelerating anode 78 of kinescope 24 is based upon the high voltage pulse step-up transformer 66 and is disclosed in detail in U. S. Patent 2,555,827, granted to S. I. Tourshou et al. on June 5, 1951. As described fully in that patent, the deflection current for the yoke winding 54 must pass through the primary 64 of the auto transformer 66 and it, therefore, induces in the secondary 80 high voltage, positive-going pulses corresponding in time to the retrace portions of the deflection cycle. These high voltage pulses are then rectified by the diode 82 to develop a high, unidirectional potential across storage capacitor 84. The voltage appearing thereacross is then applied through resistor 86 to the accelerating terminal 78 of the cathode ray tube 24. The auxiliary winding 82' of the auto transformer 66 supplies heater power for the filament 90 of the high voltage rectifier 82.

Although there appears in the above-cited Patent 2,555,831 a detailed explanation of the operation of the deflection circuits described herein, it is well to note here that, by varying the inductance 76, it is possible to effect considerable control over the scanning linearity produced by the circuit, with very little change in the actual amplitude of the deflection signal. Moreover, as stated in that patent, the direct drive arrangement of the deflection circuits contemplates the coupling of two resonant circuits, one defined by the inductance of winding 54 with its associated shunt capacitance 65 and the other defined by the transformer primary 64 with its associated shunt capacitance 64'. The linearity inductance 76 may be viewed as being partially included in either circuit depending upon the ratio of the capacitors 62 and 74.

Figure 5:
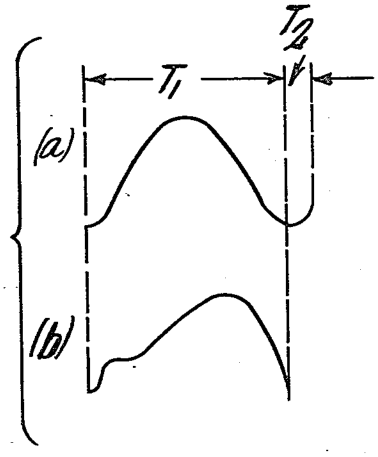
Fig. 5 illustrates waveforms to be described in the explanation of the invention.

Stated otherwise, capacitors 62 and 74 serve, in conjunction with linearity inductance 76 to introduce a predistortion in the deflection current in order to effect linear scansion despite flatness of the kinescope screen. Specifically, the action of inductance 76 to achieve such improvement in scanning linearity may be best observed from curves (*a*) and (*b*) of Fig. 5. Curve (*a*) represents the voltage appearing across capacitor 62 as a result of that portion of the sawtooth of current passing therethrough, while the voltage appearing across capacitor 74, resulting from that portion of the yoke current passing through it, is shown by curve (*b*). By properly relating the values of capacitor 62 and capacitor 74 in combination with the inductance 76, the magnitudes of the voltages of curves (*a*) and (*b*) can be controlled. Since these voltages, in fact, appear in series with the anode circuit of amplifier 38 as well as the damper diode 72, they will contribute in determining the waveform of the current passing through the deflection winding. Thus, in accordance with one aspect of the present invention, switch 49 serves to insert different amounts of resistance in series with linearity capacitor 74 whereby to change the amplitude of the inverted parabola waveform (*a*). More particularly, the less resistance that is placed in series with capacitor 74, the greater will be the amplitude of the parabola, thereby increasing the current through the deflection coil. The present invention, moreover, accomplishes width control through the variation in resistance and through another agency by means of the single switch 49.

The other agency alluded to stems to a certain extent from the disclosure of Patent No. 2,555,831 which points out the fact that the value of the amplifier output capacitance shown by dotted lines at 39 determines largely the actual co-efficient of coupling which exists between the two resonant circuits mentioned supra, thereby teaching broadly that the magnetitc energy stored in the pulse step-up primary winding 64 may be efficiently utilized by the damper diode 72 to enhance the B-boost action. As an extension of this line of reasoning, applicants herein have found that, by varying the value of the output capacitance of the deflection discharge tube 38, a variation in the amplitude of the deflection waveform may be correspondingly accomplished. That is to say, by increasing the value of such capacitive coupling between the resonant circuit defined by transformer 64 and its associated capacitance 64' and that defined by deflection winding 54 with its shunt capacitance 65, the amount of energy transferred from the primary winding to the deflection winding may be correspondingly increased, thus affording additional deflection energy which, in turn, increases the amplitude of deflection. The specific manner of selectively varying the output capacitance of discharge tube 38 together with the introduction of resistance in series with the linearity capacitor 74 will now be described.

Fig. 1 illustrates switch 49 in what may be termed position number 1, which position results in the narrowest horizontal scan or "minimum width." More specifically, switch 49 comprises a rotary member 100 having a wide "shorting" contact 102 and a narrower "non-shorting" contact 104, the switch rotor being adapted for rotation about point 106 as a center. Stationary terminals of the switch 49 are identified by reference characters "A," "B," "C," "D" and "E." In the position shown in Fig. 1, the output capacitance of amplifier 38 constitutes, in addition to the inherent capacity 39, the series arrangement of capacitors 108 and 110 through lead 112 to terminal 68 at the bottom of the deflection winding. Since two capacitors in series present a net capacitance less than the value of either of them, it will be appreciated that the amount of energy coupled between the two resonant circuits (transformer primary 64 and deflection winding 54) will be its minimum value. Additionally, tracing from terminal 48 (+B), the following elements are seen to be connected in series between that terminal and terminal 68: Resistor 90, switch terminal "B," rotor 100, non-shorting contact 104, terminal "A," resistor 92, capacitor 74, and lead 112. Thus, it will be appreciated that resistors 90 and 92 are effectively connected in series with the linearity capacitor 74 between +B terminal 48 and the bottom of the deflection winding. As stated earlier, the resistance in series with the linearity capacitor 74 has the effect of decreasing the amplitude of the parabolic voltage waveform appearing across capacitor 74, thereby decreasing the current through winding 54.

In passing, it should be noted that the screen grid voltage applied to amplifier 38 is determined primarily by the value of dropping resistor 50, since resistors 90 and 92 are practically negligible in comparison to resistor 50, insofar as voltage dropping action is concerned. By way of summary, therefore, it should be noted that by combining the action of width-decrease as a result of minimum transfer of energy between the two resonant circuits and width-decrease by decreasing the amplitude of the parabolic voltage across capacitor 74, the apparatus of Fig. 1 affords the minimum amplitude of deflection for the values of the components in use.

Figure 2:
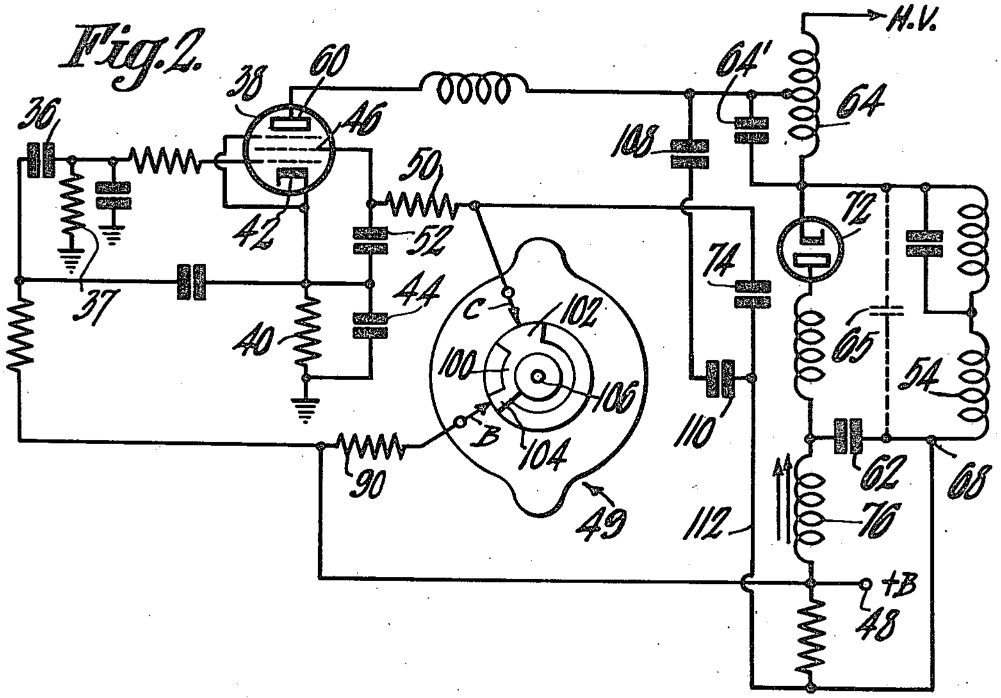
Figs. 2, 3 and 4 are similar views showing different conditions for the circuit of Fig. 1.
Figure 3:
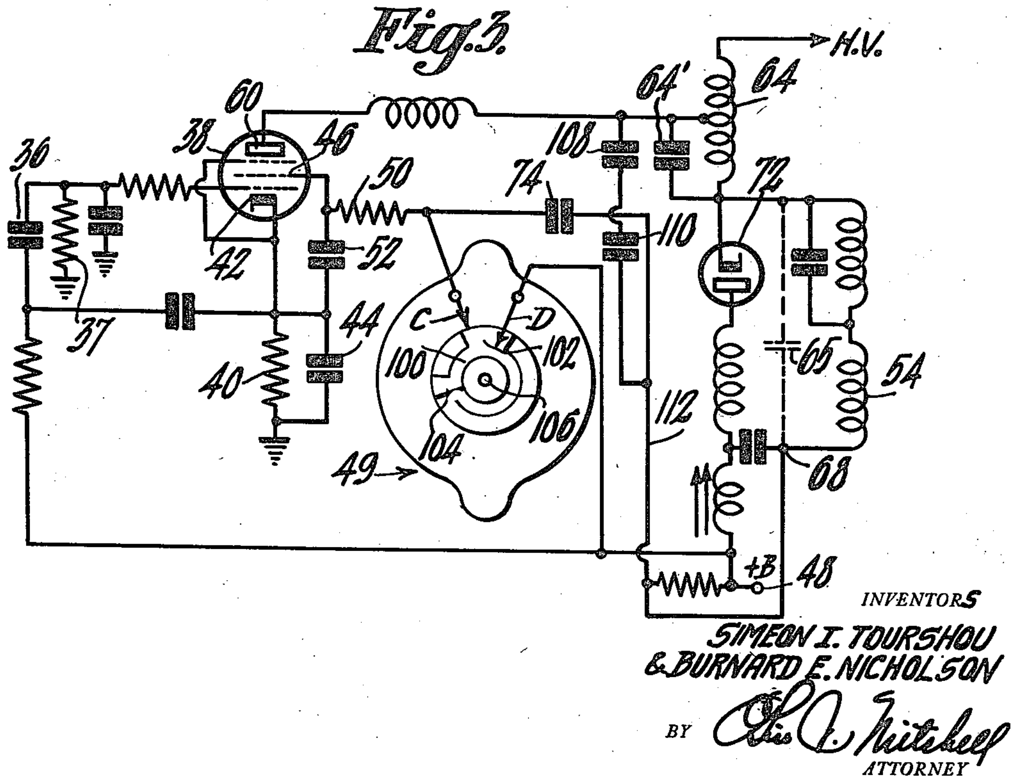
Figure 4:
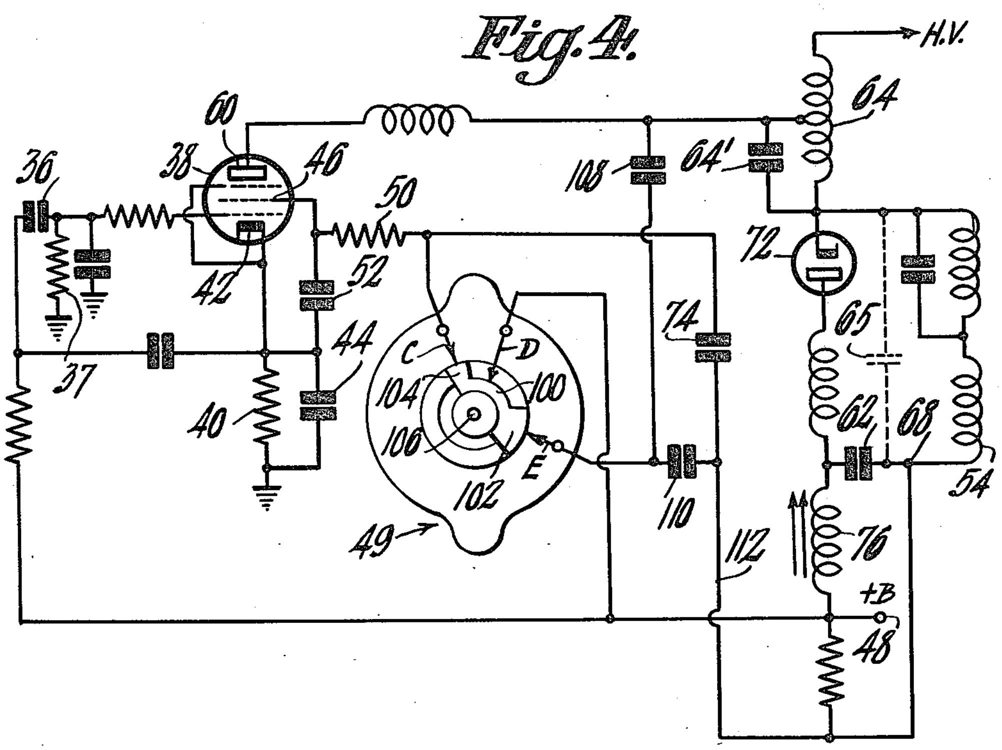

Position number 2 of the switch 49 is identified by rotating switch member 100, 30° in a clock-wise direction, so that it assumes the position shown in Fig. 2. In order to simplify the schematic showing of the circuitry, Figs. 2, 3 and 4 illustrate only those terminals of the switch which are actually in contact with the rotor for their respective positions. Prior to describing the circuit which exists for position 2 of the switch, however, it is important to note that, in changing from position 1 to position 2, the screen grid 46 of the deflection amplifier 38 is effectively disconnected from its source of potential (+B) by reason of the departure of non-shorting contact 104 of the switch rotor from terminal "A." In position 2 of the switch, as shown in Fig. 2, capacitors 108 and 110 are still in series between the anode 60 of amplifier 38 and point 68 at the bottom of the deflection winding, so that no change is made in the amount of coupling between the two resonant circuits. Movement of the switch rotor 100 to position 2, however, has eliminated resistor 92 from the circuit, as may be seen by tracing from terminal 48 as follows: terminal 48, resistor 90, terminal "B," contact 104, rotor body 100, terminal 102, contact "C," capacitor 74, to terminal 68. By eliminating resistor 92 from the circuit between terminals 48 and 68 which includes linearity capacitor 74, the amplitude of the voltage waveform appearing thereacross is greater than was the case for position 1, thus increasing the amplitude of deflection to a predetermined extent.

In moving switch rotor 100 from position 2 to position 3 (Fig. 3) a 30° clock-wise rotation is required, during which time terminal "B" loses contact with contact 104 of the rotor before terminal "D" makes contact with the rotor contact 102, the reason again being that of preventing arcing of the capacitors. In position 3, only terminals "C" and "D" are in contact with the rotor 100, both terminals being specifically in contact with the wide contact portion 102 thereof. In this position of the switch 49, still greater deflection amplitude is afforded, by reason of the elimination of resistor 90 from the circuit. Thus, tracing the circuit from terminal 48 through terminals "D" and "C" (which are in contact with rotor 100), through capacitor 74 to terminal 68, it is seen that no resistance remains in series with the linearity capacitor 74 between terminals 48 and 68. Capacitors 108 and 110 remain in series between the anode 60 of amplifier 38 and terminal 68.

The last position of the switch, namely, position 4, is shown in Fig. 4 and requires rotation of the rotor 100 an additional 90° in a clock-wise direction from position 3. In moving from position 3 to position 4, terminal "C" (connected to the screen dropping resistor 50) loses contact with contact 102 before terminal "D" loses contact with contact 102 and makes contact with the body portion 100 of the rotor. This deenergization of the screen grid is, moreover, maintained until the shorting contact 102 has made contact with its next capacitor switching terminal, the purpose of the deenergization of the screen grid being that of preventing arcing which would otherwise result from the high pulse of voltage which exists across the capacitors 108 and 110. In position 4, resistors 90 and 92 remain out of the circuit and capacitor 110 is effectively short-circuited from the circuit which includes capacitor 108 and which is connected between the anode of the output amplifier and the point of uniform potential (A.-C. ground) at terminal 48. This may be observed by tracing from the anode 60 of amplifier 38 through capacitor 108, terminal "E," contact 102, rotor body 100, terminal "D" to terminal 48. The screen grid 46 is provided with its operating potential through dropping resistor 50, terminal "C," contact 104 and terminal "D" to terminal 48 (+B). From the foregoing description of Fig. 4, it should now be apparent that position 4 of the switch affords maximum width or deflection amplitude. This is true since capacitor 108 alone is left in the circuit for coupling magnetic energy from the resonant circuit including primary winding 64 to A.-C. ground (which is tantamount to coupling energy to the deflection winding's resonant circuit, since the deflection winding is effectively at A.-C. ground potential).

By way of summary of the foregoing, it should be noted that the switch of the present invention, in moving from one position to another, insures against arcing of the capacitors, this advantage flowing from the fact that the contacts of the switch rotor 100 are designed as either the wide "shorting" contact or the narrower "non-shorting" contact. By reason of the described structure, screen grid 46 of the deflection amplifier is effectively disconnected from its source of power during the switching in and out of capacitors 108 and 110, whereby the deflection circuit is effectively deenergized.

While the invention has been described in accordance with its operation as (1) means for varying the output capacity of a deflection amplifier and (2) as means for inserting or removing resistance from the series circuit including linearity capacitor 74 between terminals 48 and 68, it will be appreciated that the switch may be modified as to detail in order to render it suitable for use in other types of width control circuits. One such other type is that described in the U. S. patent to Tourshou 2,579,627, granted September 25, 1951, in which deflection amplitude is varied by changing the amount of screen degeneration introduced. That is to say, the screen degeneration of that Tourshou patent may be accomplished selectively by means of the switch shown herein together with the variation in output capacity.

Moreover, while the invention is particularly well suited for use with a "direct drive" type of deflection system, its scope should not be limited to such an environment but is to be determined by the appended claims.

Having thus described our invention, what we claim as new and desire to secure by Letters Patent is:

1. Electro-magnetic ray beam deflection apparatus including a deflection winding, an amplifier having at least an anode and a gain controlling electrode, and means including an inductive element connected to said anode for applying an operating potential to said anode such that said amplifier causes a deflection current of predetermined wave form to flow in said deflection winding, which comprises: capacitive coupling means having a first terminal and a second terminal; means connecting said first terminal to said amplifier anode; means for applying an operating potential to said gain controlling electrode; and switch means for connecting said second terminal to a point of A.-C. ground potential, said switch means further including means for disconnecting said electrode from said second-named potential applying means.

2. In an electro-magnetic cathode ray beam deflection apparatus of the type including a deflection winding, an amplifier having its anode circuit coupled to such winding for causing a deflection current of predetermined wave form to flow therein and a screen grid, means for selectively controlling the amplitude of such deflection current wave form, comprising: a first capacitor; a second capacitor; switch means having a contact member for connecting said first capacitor between such amplifier anode circuit and a point of A.-C. ground potential; means for applying a positive operating potential to such screen grid; and means including said switch means for connecting said second capacitor in series with said first capacitor between such anode circuit and said point of A.-C. ground potential, said switch means further including means for temporarily disconnecting said screen grid from said potential applying means.

3. In an electro-magnetic cathode ray deflection system having a deflection winding, means coupling said winding in circuit with the anode-cathode circuit of an output amplifier, and an electrical damping element in shunt with a series circuit including said winding and a storage capacitance: a source of operating potential for said amplifier; means including an inductance connecting said source to the junction of said damping element and said series circuit; a second storage capacitance connected from said source to a point in said series circuit intermediate said first capacitance and said winding; and means for connecting resistance in series with said second capacitance between said source and said junction.

4. The invention as defined by claim 3 wherein said last-named means comprises a switch.

5. The invention as defined by claim 3 wherein said last-named means comprises a switch; a second resistance; said switch including means for connecting said second resistance in series with said first-named resistance.

6. The invention as defined by claim 3 including a third capacitance having first and second terminals; means connecting the first terminal of said capacitance to the anode of said output amplifier; said means for connecting resistance in series with said second capacitor including means for connecting said second terminal of said third capacitor to a point of fixed potential.

7. The invention as defined by claim 6 including a fourth capacitor; said means for connecting resistance in series with said second capacitor including means for connecting said fourth capacitor in series with said third capacitor between said anode and said point of fixed potential.

8. The invention as defined by claim 6 wherein said last-named means comprises a switch having a plurality of contact members.

9. The invention as defined by claim 7 wherein said last-named means comprises a switch having a plurality of contact members.

References Cited in the file of this patent

UNITED STATES PATENTS

| | | |
|---|---|---|
| 2,470,197 | Torsch | May 17, 1949 |
| 2,536,857 | Schade | Jan. 2, 1951 |
| 2,555,832 | Denton | June 5, 1951 |
| 2,621,309 | Faudell | Dec. 9, 1952 |